United States Patent
Garas

(10) Patent No.: US 10,313,463 B2
(45) Date of Patent: Jun. 4, 2019

(54) SYSTEMS AND METHODS FOR AVOIDING SERVER PUSH OF OBJECTS ALREADY CACHED AT A CLIENT

(71) Applicant: Akamai Technologies, Inc., Cambridge, MA (US)

(72) Inventor: Youssef Nagy Nagieb Garas, Kanata (CA)

(73) Assignee: Akamai Technologies, Inc., Cambridge, MA (US)

( * ) Notice: Subject to any disclaimer, the term of this patent is extended or adjusted under 35 U.S.C. 154(b) by 291 days.

(21) Appl. No.: 15/048,586

(22) Filed: Feb. 19, 2016

(65) Prior Publication Data

US 2016/0248866 A1 Aug. 25, 2016

Related U.S. Application Data

(60) Provisional application No. 62/118,162, filed on Feb. 19, 2015.

(51) Int. Cl.
*H04L 29/08* (2006.01)
*G06F 17/30* (2006.01)

(52) U.S. Cl.
CPC ........ *H04L 67/26* (2013.01); *G06F 17/30896* (2013.01); *H04L 67/2842* (2013.01); *H04L 67/32* (2013.01)

(58) Field of Classification Search
CPC ..... H04L 67/26; H04L 67/2842; H04L 67/32; G06F 17/30896
See application file for complete search history.

(56) References Cited

U.S. PATENT DOCUMENTS

| 5,737,619 A | 4/1998 | Judson |
| 5,802,292 A | 9/1998 | Mogul |
| 5,924,116 A | 7/1999 | Aggarwal et al. |
| 6,023,726 A | 2/2000 | Saksena |
| 6,055,572 A | 4/2000 | Saksena et al. |
| 6,088,718 A | 7/2000 | Altschuler et al. |
| 6,108,703 A | 8/2000 | Leighton et al. |
| 6,393,526 B1 | 5/2002 | Crow et al. |
| 6,799,214 B1 | 9/2004 | Li et al. |

(Continued)

FOREIGN PATENT DOCUMENTS

EP 1398715 A2 3/2004

OTHER PUBLICATIONS

Web page, GNU's Framework for Secure Peer-to-Peer Networking, Speeding Up Tor with SPDY, dated Nov. 18, 2013, available at https://gnunet.org/speedingtorspdy, downloaded as of Jan. 28, 2016, 2 pages.

(Continued)

*Primary Examiner* — Philip J Chea
*Assistant Examiner* — Robert B McAdams

(57) ABSTRACT

This patent document describes, among other things, methods, apparatus, and systems for tracking those resources that a server has pushed to a client, e.g., using the HTTP 2.0 or other server push mechanism. Pushed resources may be cached at the client. By tracking such pushed resources, a server can avoid pushing such cached resources in response to subsequent requests from that client; doing so would be wasteful if the client already has the resource cached. Among other things, techniques for storing, encoding, organizing, and managing data about pushed resources in cookies are disclosed.

18 Claims, 5 Drawing Sheets

| Client Type | Mobile | | Tablet | | Desktop | |
|---|---|---|---|---|---|---|
| TTL | 24 Hours | 1 Hour | 24 Hours | 1 Hour | 24 Hours | 1 Hour |
| URL | a.com/b | | | | | |
| Resources | x.css | z.js | x.css | z.js | x.css | z.js |
| | y_m.css | l_m.png | y_t.css | l_t.png | y_d.css | l_d.png |
| URL | a.com/c | | | | | |
| Resources | x.css | n.js | x.css | z.js | x.css | z.js |
| | m_m.css | k_m.png | m_t.css | l_t.png | m_d.css | l_d.png |
| PR List Name | Mobile24 | Mobile1 | Tablet24 | Tablet1 | Desktop24 | Desktop1 |
| | 0:x.css | 0:z.js | 0:x.css | 0:z.js | 0:x.css | 0:z.js |
| | 1:y_m.css | 1:l_m.png | 1:y_t.css | 1:l_t.png | 1:y_d.css | 1:l_d.png |
| | 2:m_m.css | 2:n.js | 2:m_t.css | 2:n.js | 2:m_d.css | 2:n.js |
| | | 3:k_m.png | | 3:k_t.png | | 3:k_d.png |

(56) References Cited

U.S. PATENT DOCUMENTS

| | | | |
|---|---|---|---|
| 6,820,133 | B1 | 11/2004 | Grove et al. |
| 6,931,439 | B1 | 8/2005 | Hanmann et al. |
| 7,111,057 | B1 | 9/2006 | Wein et al. |
| 7,240,100 | B1 | 7/2007 | Wein et al. |
| 7,274,658 | B2 | 9/2007 | Bornstein et al. |
| 7,296,082 | B2 | 11/2007 | Leighton et al. |
| 7,343,396 | B2 | 3/2008 | Kausik et al. |
| 7,376,716 | B2 | 5/2008 | Dilley et al. |
| 7,472,178 | B2 | 12/2008 | Rose et al. |
| 7,596,619 | B2 | 9/2009 | Leighton et al. |
| 7,600,025 | B2 | 10/2009 | Lewin et al. |
| 7,607,062 | B2 | 10/2009 | Grove et al. |
| 7,660,296 | B2 | 2/2010 | Fletcher et al. |
| 8,112,471 | B2 | 2/2012 | Wei et al. |
| 8,447,837 | B2 | 5/2013 | Devanneaux et al. |
| 8,583,820 | B2 | 11/2013 | Harrang et al. |
| 8,589,508 | B2 | 11/2013 | Harrang et al. |
| 8,589,585 | B2 | 11/2013 | Harrang et al. |
| 8,824,289 | B2 | 9/2014 | Gormley et al. |
| 8,832,305 | B2 | 9/2014 | Moinzadeh et al. |
| 8,856,263 | B2 | 10/2014 | Fainberg et al. |
| 8,886,790 | B2 | 11/2014 | Harrang et al. |
| 9,106,607 | B1 | 8/2015 | Lepeska et al. |
| 9,118,623 | B2 | 8/2015 | Devanneaux et al. |
| 9,641,549 | B2 * | 5/2017 | Holloway ............ H04L 63/1458 |
| 2002/0103778 | A1 | 8/2002 | Saxena et al. |
| 2003/0065743 | A1 | 4/2003 | Jenny et al. |
| 2003/0101234 | A1 | 5/2003 | McBrearty et al. |
| 2003/0182357 | A1 | 9/2003 | Chess et al. |
| 2004/0117486 | A1 | 6/2004 | Bourne et al. |
| 2004/0249709 | A1 | 12/2004 | Donovan et al. |
| 2004/0258053 | A1 | 12/2004 | Toporek et al. |
| 2005/0044321 | A1 | 2/2005 | Bialkowski et al. |
| 2005/0138143 | A1 | 6/2005 | Thompson et al. |
| 2006/0106807 | A1 | 5/2006 | DeVitis et al. |
| 2006/0143147 | A1 | 6/2006 | Pearson et al. |
| 2007/0106748 | A1 * | 5/2007 | Jakobsson ............ H04L 63/0807 709/217 |
| 2007/0143344 | A1 | 6/2007 | Luniewski et al. |
| 2007/0150822 | A1 | 6/2007 | Mansour et al. |
| 2007/0156845 | A1 | 7/2007 | Devanneaux et al. |
| 2007/0185986 | A1 * | 8/2007 | Griffin .................... G06Q 30/02 709/224 |
| 2008/0222242 | A1 | 9/2008 | Weiss et al. |
| 2009/0002481 | A1 | 1/2009 | Kim et al. |
| 2009/0024801 | A1 | 1/2009 | Choi et al. |
| 2009/0222584 | A1 * | 9/2009 | Josefsberg ........ H04L 29/12066 709/245 |
| 2011/0173345 | A1 | 7/2011 | Knox et al. |
| 2011/0312386 | A1 | 12/2011 | White et al. |
| 2012/0136928 | A1 | 5/2012 | Dillon et al. |
| 2012/0265853 | A1 | 10/2012 | Knox et al. |
| 2013/0166634 | A1 | 6/2013 | Holland et al. |
| 2013/0191360 | A1 | 7/2013 | Burkard et al. |
| 2014/0006484 | A1 | 1/2014 | Devanneaux et al. |
| 2014/0189069 | A1 * | 7/2014 | Gero .................... H04L 67/2842 709/219 |
| 2014/0280691 | A1 | 9/2014 | Buerner et al. |
| 2014/0281918 | A1 | 9/2014 | Wei et al. |
| 2014/0359491 | A1 | 12/2014 | Teeraparpwong et al. |
| 2014/0379840 | A1 | 12/2014 | Dao et al. |
| 2015/0046789 | A1 | 2/2015 | Wei et al. |
| 2015/0088968 | A1 | 3/2015 | Wei et al. |
| 2015/0088969 | A1 | 3/2015 | Wei et al. |
| 2015/0088970 | A1 | 3/2015 | Wei et al. |
| 2015/0088975 | A1 * | 3/2015 | Wei ........................ H04L 67/10 709/203 |
| 2015/0089352 | A1 | 3/2015 | Conboy et al. |
| 2015/0120821 | A1 | 4/2015 | Bendell |

OTHER PUBLICATIONS

"Cache-aware server-push, Issue #421, h2o/h2o, GitHub", internet discussion thread, first comment dated Jul. 24, 2015, 12 pages, downloaded Nov. 21, 2017 from https://github.com/h2o/h2o/issues/421.

U.S. Appl. No. 15/011,412, Non-final Office Action dated Oct. 19, 2017, 43 pages.

U.S. Appl. No. 15/011,409.

U.S. Appl. No. 15/011,412.

Barth, A., RFC 6265, HTTP State Management Mechanism, Internet Engineering Task Force (IETF), U.C. Berkeley, Apr. 2011, 37 pages.

Uzonov, A., Speeding Up Tor With SPDY, Master's Thesis, Munich Technical University, Nov. 15, 2013, 124 pages, available at https://gnunet.org/sites/default/files/uzunov2013torspdy.pdf, downloaded as of Sep. 23, 2014.

Andrea Trasatti, blog, "Measuring the speed of resource loading with JavaScript and HTML5 / Andrea Trasatti's tech notes and more", posted Dec. 10, 2012, 11 pages, available at http://blog.trasatti.it/2012/12/measuring-the-speed-of-resource-loading-wit.

Arun Venkataramani, The potential costs and benefits of long-term prefetching for content distribution, Computer Communications 25 (2002), Elsevier, 367-375.

HTML Living Standard—Last Updated Oct. 11, 2013, HTML5, Wayback machine archive located at https://web.archive.org/web/20131013212708/http://www.whatwg.org/specs/webapps/currentwork/, 445 pages, (downloaded Dec. 15, 2015).

IETF HTTPbis Working Group, Internet-Draft, Nov. 29, 2014, M. Belshe et al., M. Thomson, Ed., Hypertext Transfer Protocol Version 2 (HTTP/2) [draft-ietf-httpbis-http2-16 ], 92 pages.

IETF Request for Comments 7540, May 2015, M. Belshe et al., M. Thomson, Ed., Hypertext Transfer Protocol Version 2 (HTTP/2), 96 pages.

Liljeberg, Enhanced Services for World Wide Web in Mobile WAN Environment, Univ of Helsinki, Department of Computer Science, Series of Publications C, No. C-1996-28, Apr. 1996, 15 pages.

Mike's Lookout Blog, SPDY of the Future Might Blow Your Mind Today, Nov. 17, 2011, 6 pages, available at https://www.belshe.com/2011/11/17/spdy-of-the-future-might-blow-your-mind-today/, downloaded as of Feb. 19, 2015.

Navigation Timing, Editor's Draft Mar. 30, 2012 (Zhiheng Wang, editor), W3C 2012, available at http://dvcs.w3.org/hg/webperf/raw-file/tip/specs/NavigatioTiming/Overview.html, 15 pages.

Navigation Timing, W3C Recommendation, Dec. 17, 2012 (Zhiheng Wang, editor), W3C 2012, available at http://www.w3.org/TR/navigation-timing/, 16 pages, downloaded Feb. 1, 2016.

Nicholas Armstrong, Just-In-Time Push Prefetching: Accelerating the MobileWeb, Univ. of Waterloo Master's Thesis, Waterloo, Ontario, Canada, 2011, 103 pages, available at https://uwspace.uwaterloo.ca/bitstream/handle/10012/6256/Armstrong_Nicholas.pdf?seque.

Padmanabhan et al., Using Predictive Prefetching to Improve World Wide Web Latency, ACM SIGCOMM Computer Communication Review, vol. 26 Issue 3, Jul. 1996, pp. 22-36.

Program for 29 International Conference on Computers and Their Applications (CATA-2014) by Int'l Society for Computers and Their Applications (ISCA), Mar. 24-26, 2014, Flamingo Hotel, Las Vegas, NV, 9 pages (mentioning presentation on Mar. 26 of Randy Appleton.

Randy Appleton et al., Evaluating Several Different Web Prediction Algorithms, Northern Michigan University, 5 pages, available at http://euclid.nmu.edu/~joshthom/web-paper-randy.pdf, downloaded as of Sep. 23, 2014.

Resource Timing, W3C Candidate Recommendation, May 22, 2012 (Jatinder Mann et al., editors), W3C 2012, available at http://www.w3.org/TR/2012/CR-resource-timing-20120522/, 11 pages.

Resource Timing, W3C Working Draft, Jan. 13, 2016 (Arvind Jain et al., editors), W3C 2016, available at http://www.w3.org/TR/resource-timing/, downloaded Feb. 1, 2016, 13 pages.

Revision 307873 of Link prefetching FAQ, Sep. 17, 2012, at https://developer.mozilla.org/enUS/docs/Web/HTTP/Link_prefetching_FAQ$revision/307873, 5 pages (downloaded Dec. 15, 2015).

Stuart Schecter et al., Using Path Profiles to Predict HTTP requests, Computer Networks and ISDN Systems 30 (1998) 457-467.

(56) References Cited

OTHER PUBLICATIONS

The Chromium Projects, SPDY: An experimental protocol for a faster web, Internet Archive Wayback machine archive located at http://www.chromium.org/spdy/spdy-whitepaper, 7 pages, (downloaded Jan. 22, 2015).
U.S. Appl. No. 14/584,770.
U.S. Appl. No. 14/584,820.
U.S. Appl. No. 14/732,183.
U.S. Appl. No. 14/833,243, filed May 20, 2013.
Venketesh, et al., Graph Based Prediction Model to Improve Web Prefetching, International Journal of Computer Applications (0975-8887), vol. 36-No. 10, pp. 37-43, Dec. 2011.
Walsh, David, HTML5 Link Prefetching, Jul. 7, 2010 at https://davidwalsh.name/html5prefetch, 12 pages (downloaded Dec. 15, 2015).
Office Action, for U.S. Appl. No. 15/011,412, dated Jun. 29, 2018, 22 pages.
Office Action, for U.S. Appl. No. 15/011,412, dated Nov. 15, 2018, 27 pages.

\* cited by examiner

| Client Type | Mobile | | Tablet | | Desktop | |
|---|---|---|---|---|---|---|
| TTL | 24 Hours | 1 Hour | 24 Hours | 1 Hour | 24 Hours | 1 Hour |
| URL | a.com/b | | | | | |
| Resources | x.css | z.js | x.css | z.js | x.css | z.js |
| | y_m.css | l_m.png | y_t.css | l_t.png | y_d.css | l_d.png |
| URL | a.com/c | | | | | |
| Resources | x.css | n.js | x.css | z.js | x.css | z.js |
| | m_m.css | k_m.png | m_t.css | l_t.png | m_d.css | l_d.png |
| PR List Name | Mobile24 | Mobile1 | Tablet24 | Tablet1 | Desktop24 | Desktop1 |
| | 0:x.css | 0:z.js | 0:x.css | 0:z.js | 0:x.css | 0:z.js |
| | 1:y_m.css | 1:l_m.png | 1:y_t.css | 1:l_t.png | 1:y_d.css | 1:l_d.png |
| | 2:m_m.css | 2:n.js | 2:m_t.css | 2:n.js | 2:m_d.css | 2:n.js |
| | | 3:k_m.png | | 3:k_t.png | | 3:k_d.png |

*FIG. 4*

SYSTEMS AND METHODS FOR AVOIDING SERVER PUSH OF OBJECTS ALREADY CACHED AT A CLIENT

CROSS REFERENCE TO RELATED APPLICATIONS

This application is based on and claims the benefit of priority of U.S. Application No. 62/118,162, filed Feb. 19, 2015, the contents of which are hereby incorporated by reference.

BACKGROUND

Technical Field

This disclosure relates generally to distributed data processing systems and to the delivery of content to users over computer networks.

Brief Description of the Related Art

Content Delivery Networks

Distributed computer systems are known in the art. One such distributed computer system is a "content delivery network" or "CDN" that is operated and managed by a service provider. The service provider typically provides the content delivery service on behalf of third parties. A "distributed system" of this type typically refers to a collection of autonomous computers linked by a network or networks, together with the software, systems, protocols and techniques designed to facilitate various services, such as content delivery or the support of outsourced site infrastructure. This infrastructure is shared by multiple tenants, the content providers. The infrastructure is generally used for the storage, caching, or transmission of content—such as web pages, streaming media and applications—on behalf of such content providers or other tenants. The platform may also provide ancillary technologies used therewith including, without limitation, DNS query handling, provisioning, data monitoring and reporting, content targeting, personalization, and business intelligence.

In a known system such as that shown in FIG. 1, a distributed computer system 100 is configured as a content delivery network (CDN) and has a set of servers 102 distributed around the Internet. Typically, most of the servers are located near the edge of the Internet, i.e., at or adjacent end user access networks. A network operations command center (NOCC) 104 may be used to administer and manage operations of the various machines in the system. Third party sites affiliated with content providers, such as web site 106, offload delivery of content (e.g., HTML or other markup language files, embedded page objects, streaming media, software downloads, and the like) to the distributed computer system 100 and, in particular, to the CDN servers (which are sometimes referred to as content servers, or sometimes as "edge" servers in light of the possibility that they are near an "edge" of the Internet). Such servers may be grouped together into a point of presence (POP) 107 at a particular geographic location.

The CDN servers are typically located at nodes that are publicly-routable on the Internet, in end-user access networks, peering points, within or adjacent nodes that are located in mobile networks, in or adjacent enterprise-based private networks, or in any combination thereof.

Typically, content providers offload their content delivery by aliasing (e.g., by a DNS CNAME) given content provider domains or sub-domains to domains that are managed by the service provider's authoritative domain name service. The server provider's domain name service directs end user client machines 122 that desire content to the distributed computer system (or more particularly, to one of the CDN servers in the platform) to obtain the content more reliably and efficiently. The CDN servers respond to the client requests, for example by fetching requested content from a local cache, from another CDN server, from the origin server 106 associated with the content provider, or other source, and sending it to the requesting client.

For cacheable content, CDN servers typically employ on a caching model that relies on setting a time-to-live (TTL) for each cacheable object. After it is fetched, the object may be stored locally at a given CDN server until the TTL expires, at which time is typically re-validated or refreshed from the origin server 106. For non-cacheable objects (sometimes referred to as 'dynamic' content), the CDN server typically returns to the origin server 106 time when the object is requested by a client. The CDN may operate a server cache hierarchy to provide intermediate caching of customer content in various CDN servers that are between the CDN server handling a client request and the origin server 106; one such cache hierarchy subsystem is described in U.S. Pat. No. 7,376,716, the disclosure of which is incorporated herein by reference.

Although not shown in detail in FIG. 1, the distributed computer system may also include other infrastructure, such as a distributed data collection system 108 that collects usage and other data from the CDN servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115. A distributed data transport mechanism 120 may be used to distribute control information (e.g., metadata to manage content, to facilitate load balancing, and the like) to the CDN servers. The CDN may include a network storage subsystem (sometimes referred to herein as "NetStorage") which may be located in a network datacenter accessible to the CDN servers and which may act as a source of content, such as described in U.S. Pat. No. 7,472,178, the disclosure of which is incorporated herein by reference.

As illustrated in FIG. 2, a given machine 200 in the CDN comprises commodity hardware (e.g., a microprocessor) 202 running an operating system kernel (such as Linux® or variant) 204 that supports one or more applications 206a-n. To facilitate content delivery services, for example, given machines typically run a set of applications, such as an HTTP proxy 207, a name service 208, a local monitoring process 210, a distributed data collection process 212, and the like. The HTTP proxy 207 typically includes a manager process for managing a cache and delivery of content from the machine. For streaming media, the machine may include one or more media servers, such as a Windows® Media Server (WMS) or Flash server, as required by the supported media formats.

A given CDN server shown in FIG. 1 may be configured to provide one or more extended content delivery features, preferably on a domain-specific, content-provider-specific basis, preferably using configuration files that are distributed to the CDN servers using a configuration system. A given configuration file preferably is XML-based and includes a set of content handling rules and directives that facilitate one or more advanced content handling features. The configuration file may be delivered to the CDN server via the data transport mechanism. U.S. Pat. No. 7,240,100, the contents of which are hereby incorporated by reference, describe a useful infrastructure for delivering and managing CDN server content control information and this and other control information (sometimes referred to as "metadata") can be provisioned by the CDN service provider itself, or (via an extranet or the like) the content provider customer who operates the origin server. U.S. Pat. No. 7,111,057, incorporated herein by reference, describes an architecture for purging content from the CDN. More information about a CDN platform can be found in U.S. Pat. Nos. 6,108,703 and 7,596,619, the teachings of which are hereby incorporated by reference in their entirety.

In a typical operation, a content provider identifies a content provider domain or sub-domain that it desires to have served by the CDN. When a DNS query to the content provider domain or sub-domain is received at the content provider's domain name servers, those servers respond by returning the CDN hostname (e.g., via a canonical name, or CNAME, or other aliasing technique). That network hostname points to the CDN, and that hostname is then resolved through the CDN name service. To that end, the CDN name service returns one or more IP addresses. The requesting client application (e.g., browser) then makes a content request (e.g., via HTTP or HTTPS) to a CDN server machine associated with the IP address. The request includes a host header that includes the original content provider domain or sub-domain. Upon receipt of the request with the host header, the CDN server checks its configuration file to determine whether the content domain or sub-domain requested is actually being handled by the CDN. If so, the CDN server applies its content handling rules and directives for that domain or sub-domain as specified in the configuration. These content handling rules and directives may be located within an XML-based "metadata" configuration file, as mentioned previously.

The CDN platform may be considered an overlay across the Internet on which communication efficiency can be improved. Improved communications on the overlay can help when a CDN server needs to obtain content from an origin server 106, or otherwise when accelerating non-cacheable content for a content provider customer. Communications between CDN servers and/or across the overlay may be enhanced or improved using improved route selection, protocol optimizations including TCP enhancements, persistent connection reuse and pooling, content & header compression and de-duplication, and other techniques such as those described in U.S. Pat. Nos. 6,820,133, 7,274,658, 7,607,062, and 7,660,296, among others, the disclosures of which are incorporated herein by reference.

As an overlay offering communication enhancements and acceleration, the CDN server resources may be used to facilitate wide area network (WAN) acceleration services between enterprise data centers and/or between branch-headquarter offices (which may be privately managed), as well as to/from third party software-as-a-service (SaaS) providers used by the enterprise users.

CDN customers may subscribe to a "behind the firewall" managed service product to accelerate Intranet web applications that are hosted behind the customer's enterprise firewall, as well as to accelerate web applications that bridge between their users behind the firewall to an application hosted in the internet cloud (e.g., from a SaaS provider).

To accomplish these two use cases, CDN software may execute on machines (potentially in virtual machines running on customer hardware) hosted in one or more customer data centers, and on machines hosted in remote "branch offices." The CDN software executing in the customer data center typically provides service configuration, service management, service reporting, remote management access, customer SSL certificate management, as well as other functions for configured web applications. The software executing in the branch offices provides last mile web acceleration for users located there. The CDN itself typically provides CDN hardware hosted in CDN data centers to provide a gateway between the nodes running behind the customer firewall and the CDN service provider's other infrastructure (e.g., network and operations facilities). This type of managed solution provides an enterprise with the opportunity to take advantage of CDN technologies with respect to their company's intranet, providing a wide-area-network optimization solution. This kind of solution extends acceleration for the enterprise to applications served anywhere on the Internet. By bridging an enterprise's CDN-based private overlay network with the existing CDN public internet overlay network, an end user at a remote branch office obtains an accelerated application end-to-end. FIG. 3 illustrates a general architecture for a WAN optimized, "behind-the-firewall" service offering such as that described above. Other information about a behind the firewall service offering can be found in teachings of U.S. Pat. No. 7,600,025, the teachings of which are hereby incorporated by reference.

For live streaming delivery, the CDN may include a live delivery subsystem, such as described in U.S. Pat. No. 7,296,082, and U.S. Publication Nos. 2011/0173345 and 2012/0265853, the contents of which are incorporated herein by reference.

HTTP 2.0

The Hypertext Transfer Protocol (HTTP) is a well-known application layer protocol. It is often used for transporting HTML documents that define the presentation of web pages, as well as the embedded resources associated with such pages. The HTTP 1.0 and 1.1 standards came about in the 1990s. Recently, HTTP 2.0, a major revision to HTTP, has been approved for standards track consideration by the IETF (RFC 7540). The HTTP 2.0 proposed standard has been in development for some time (see, e.g., HTTP version 2, working draft, draft-ietf-httpbis-http2-16, Nov. 29, 2014). According to that working draft and RFC 7540, HTTP 2.0 enables efficient use of network resources and a reduced perception of latency by introducing header field compression and allowing multiple concurrent messages on the same connection. It also introduces unsolicited push of representations from servers to clients. HTTP 2.0 is based on an earlier protocol, SPDY, which also included an unsolicited push feature.

Server push features present the opportunity for increased efficiencies, but they must be used wisely. For example, it is known in the art to predict resources that a client may request, given an initial request (e.g., for a base HTML page). A variety of prediction algorithms are known in the art, including the prefetching approaches described in U.S. Pat. No. 8,447,837, US Patent Publication No. 2014/0379840, US Patent Publication No. 2015/0089352, and US Patent Publication No. 2015/0120821, the contents of all of which are hereby incorporated by reference.

It is also known in the art to use predictions to push resources to a client using the push mechanism contemplated in SPDY and HTTP 2.0. Pushing content to the client can result in wasted bandwidth and delayed page load time if the prediction is wrong, or if the client already has the resource in a client-side cache. To address this issue, it has been proposed in the prior art that the hint mechanism of SPDY could be used to search the browser's cache to ensure that already-cached resources are not re-fetched by the proxy. (See, e.g., Nicholas Armstrong, Just in Time Push Prefetching: Accelerating the Mobile Web, University of Waterloo Master's Thesis, 2011.) Further, Uzonov (Andrey Uzonov, Speeding Up Tor With SPDY, Master's Thesis, Munich Technical University, 2013) proposes collecting statistical data about resource requests for a page, and for subsequent page requests, pushing resources when his proposed algorithm(s) are confident enough that they would be requested in the page load. The algorithms described by Uzonov take into account the frequency with which a resource is requested overall, or for a particular page load, as well as the number of times that a resource has been seen after the first page load in a session, or in prior page loads. Several algorithms are proposed. Uzonov investigates the use of a cost function for pushing resources that accounts for hits and mistakes. Uzonov also proposes, among other things, considering the device type or browser type (user-agent) in determining whether to push assets, setting a maximum asset size for push, and keeping track of the assets that have been provided to the client previously (at the server or at the client) to avoid re-sending them. For example, Uzonov proposes using a Bloom filter sent by the client to track whether a resource is cached at the client.

US Patent Publication No. 2009/002481 describes a method and system to detect a cached web page that involves a cookie generator, cookie distributor and cookie evaluator. US Patent Publication No. 20060106807 describes a system and method in which a cookie contains a list of files that includes the files currently stored on a local media file cache. See, for example, paragraphs 52-53 and 62-63.

Further, U.S. application Ser. Nos. 15/011,412 and 15/011,409, both filed Jan. 29, 2016, describe (among other things) methods and systems related to determining resources to push to a client.

While the foregoing approaches are valuable, the teachings hereof provide unique and improved methods to avoid pushing objects to a client that the client already has cached, and/or have been pushed by that server or a related server (such as another server in a CDN), when leveraging a push mechanism such as that provided HTTP 2.0. The teachings hereof are not necessarily limited to HTTP 2.0, but apply to any mechanism for pushing web page components from a server to a client.

The teachings hereof can be used to improve the efficiency of web page loading and of network usage, among other things. For example, the solutions present herein provides a number of advantages over previously proposed techniques, such as the Bloom filter approach of Uzonov. The solutions disclosed herein can be used to provide a much smaller cookie size and confidence of 100% if a resource has been pushed before or not. They also account for the practical cases of resources with different time to live and different client types requesting different types of resources. The foregoing are examples of potential advantages of the teachings hereof, and not to define advantages or features that must be achieved to take advantage of the invention. The claims alone define the scope of protection.

SUMMARY

A variety of methods, systems, and apparatus disclosed herein. Below are some non-limiting examples, included here to present an overview. The claims alone define the scope of the protection of this patent document.

In one embodiment, there is a method performed by a web server to avoid pushing resources cached at a client. The method involves the web server receiving a request from a client for an markup language document, such as an HTML or XML document. The markup language document is typically associated with and locatable at a Universal Resource Locator (URL). The web server accesses (e.g., from memory or other local or remote storage) a stored list of pushable resources that is associated with the URL, the stored list comprising a list of a plurality of pushable resources. There are many ways to develop such a list, any of which is suitable for the invention. The web server sends the markup language document to the client, in response to the request. The web server also pushes a particular resource other than the markup language document to the client, without an associated client request therefor, the particular resource being pushed because the particular resource is on the stored list. The web server can send the markup language document before pushing the resource, or afterwards. The order of those actions is not a limitation of this invention. The web server also sets a cookie on the client, the cookie comprising a single bit whose index corresponds to the particular resource that was pushed from the web server and that is on the stored list. The single bit is set (set to '1', for example), to indicate that the particular resource has been pushed to the client. Thus, on subsequent requests, the client will send the cookie, and the web server will know that the particular resource has been pushed and is likely cached.

While the above example has focused on one particular resource, it should be understood that the web server can push multiple resources to the client and track multiple resources in the cookie, using the same approach. Each resource can be tracked by its own single bit with index corresponding to the respective resource.

In another embodiment, there is a method performed by a web server to avoid pushing resources cached at a client. The method involves the web server receiving a request from a client for a markup language document, the markup language document being associated with and locatable at a Universal Resource Locator (URL). The web server accesses a first stored list of pushable resources that is associated with the URL, the stored list comprising a first list of a plurality of pushable resources that are each associated with time to live (TTL) values below a particular value. (For example, 1 hour.) The web server sends the markup language document to the client, in response to the request. The web server also pushes a first resource other than the markup language document to the client, without an associated client request for the first resource, the first resource being pushed because the first resource is on the first stored list. (Again, the serving of the HTML and the pushing of the resource can be in any order.) The web server sets a first cookie on the client, the first cookie comprising data corresponding to the first resource that was pushed from the web server and that is on the first stored list, the data indicating that the first resource has been pushed to the client. The first cookie has a first lifetime longer than the particular value. The web server accesses a second stored list of pushable resources that is associated with the URL, the second stored list comprising a second list of a plurality of pushable resources that are each associated with time to live (TTL) values above the particular value. The web server pushes a second resource other than the markup language document to the client, without an associated client request for the second resource, the second resource being pushed because the second resource is on the second stored list. The web server sets a second cookie on the client, the second cookie comprising data corresponding to the second resource that was pushed from the web server and that is on the second stored list, the data indicating that the second resource has been pushed to the client. The second cookie can have a second lifetime greater than any of the TTL values in the second stored list. Thus, the first cookie may reference resources that have TTLs below 1 hour, while the second cookie may reference resources greater than 1 hour, by way of non-limiting example.

In another embodiment, there is a method for avoiding server push of resources cached at a client. The method involves, with a web server, receiving a request from a client for a markup language document, the markup language document being associated with and locatable at a Universal Resource Locator (URL). The web server accesses a stored list of pushable resources that is associated with the particular domain name, the stored list comprising a list of a plurality of pushable resources. The web server sending the markup language document to the client, in response to the request. The web server pushes a particular resource other than the markup language document to the client, without an associated client request for the particular resource, the particular resource being pushed because the particular resource is on the stored list. (Again, the serving of the HTML and the pushing of the resource can be in any order.) The web server sets a cookie on the client, the cookie comprising data corresponding to the particular resource that was pushed from the web server and that is on the stored list, the data indicating that the particular resource has been pushed to the client. Each of the plurality of pushable resources on the stored list is associated with a time to live (TTL) value and the stored list is associated with a lifetime. The cookie stores lifetime data that defines a lifetime for the cookie equivalent to the lifetime for the stored list; the lifetime is preferably longer than the TTL values of all the pushable resources on the stored list. The method also involves, prior to the web server receiving the request, and with a process executing on the web server or on a server distinct from the web server, determining TTL values associated with each of the plurality of pushable resources on the stored list, and assigning the plurality of pushable resources to the stored list because they have TTL values less than the lifetime of the stored list.

As those skilled in the art will understand, the example methods described above, and any of teachings hereof, can be realized in a system of computing machines, each machine comprising at least one microprocessor and memory storing instructions for execution on the at least one microprocessor to cause the system of computing machines to perform such method. Also, the example methods described above, and any of teachings hereof, can be realized in a non-transitory computer readable medium containing instructions for execution by one or more microprocessors in one or more computing machines that, upon execution, cause the one or more computing machines to perform the method of any prior claim.

BRIEF DESCRIPTION OF THE DRAWINGS

The invention will be more fully understood from the following detailed description taken in conjunction with the accompanying drawings, in which:

FIG. 4 is a table illustrating how different Pushable Resource lists can be organized for varying client types and for resources with varying time to live (TTL) values; and, FIG. 5 is a block diagram illustrating hardware in a computer system that may be used to implement the teachings hereof.

DETAILED DESCRIPTION

Figure 1:
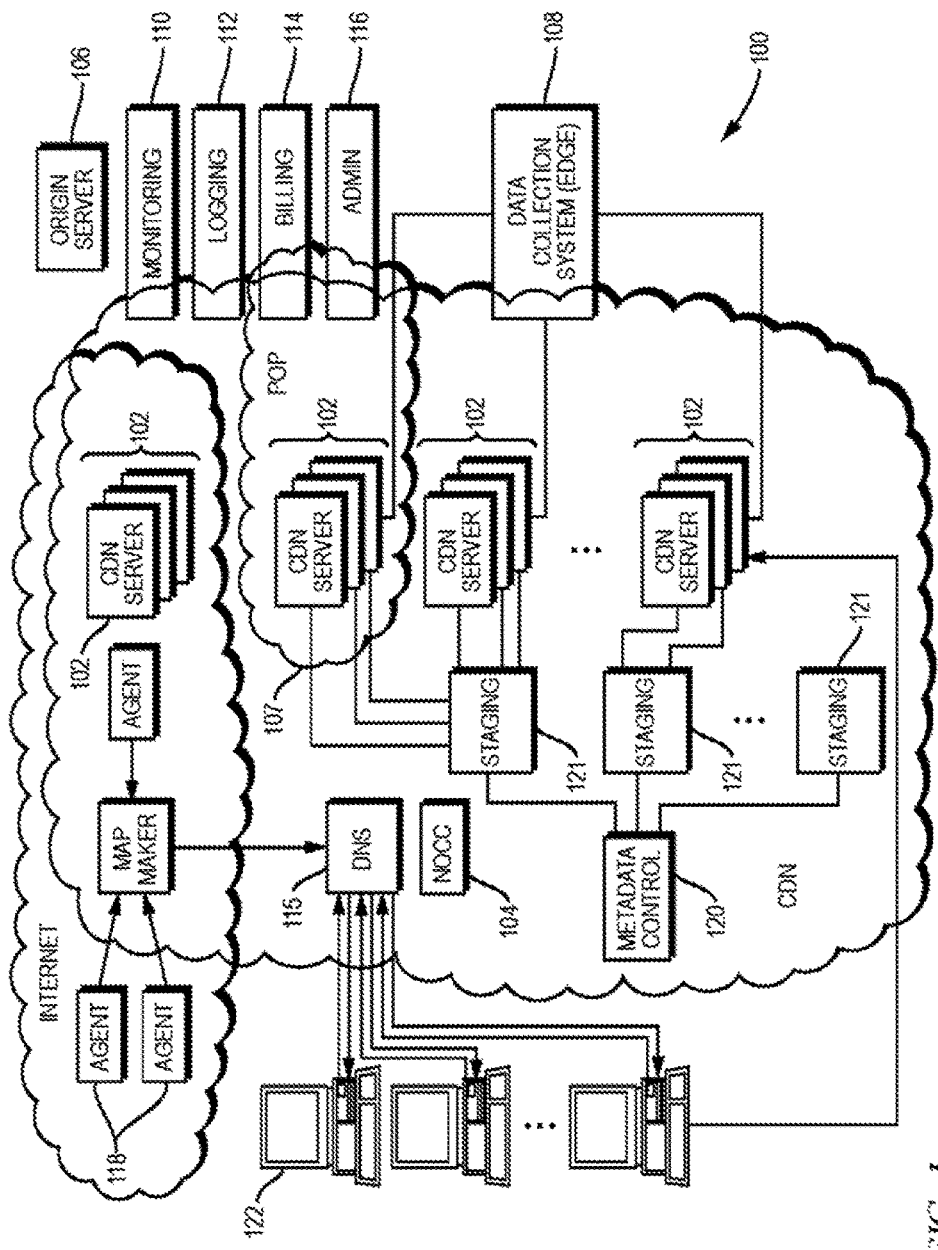
FIG. 1 is a schematic diagram illustrating one embodiment of a known distributed computer system configured as a content delivery network.
Figure 2:
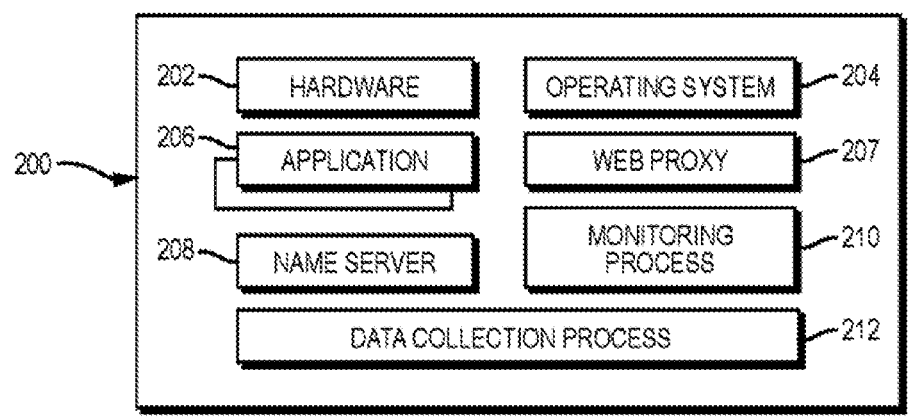
FIG. 2 is a schematic diagram illustrating one embodiment of a machine on which a CDN server in the system of FIG. 1 can be implemented.
Figure 3:
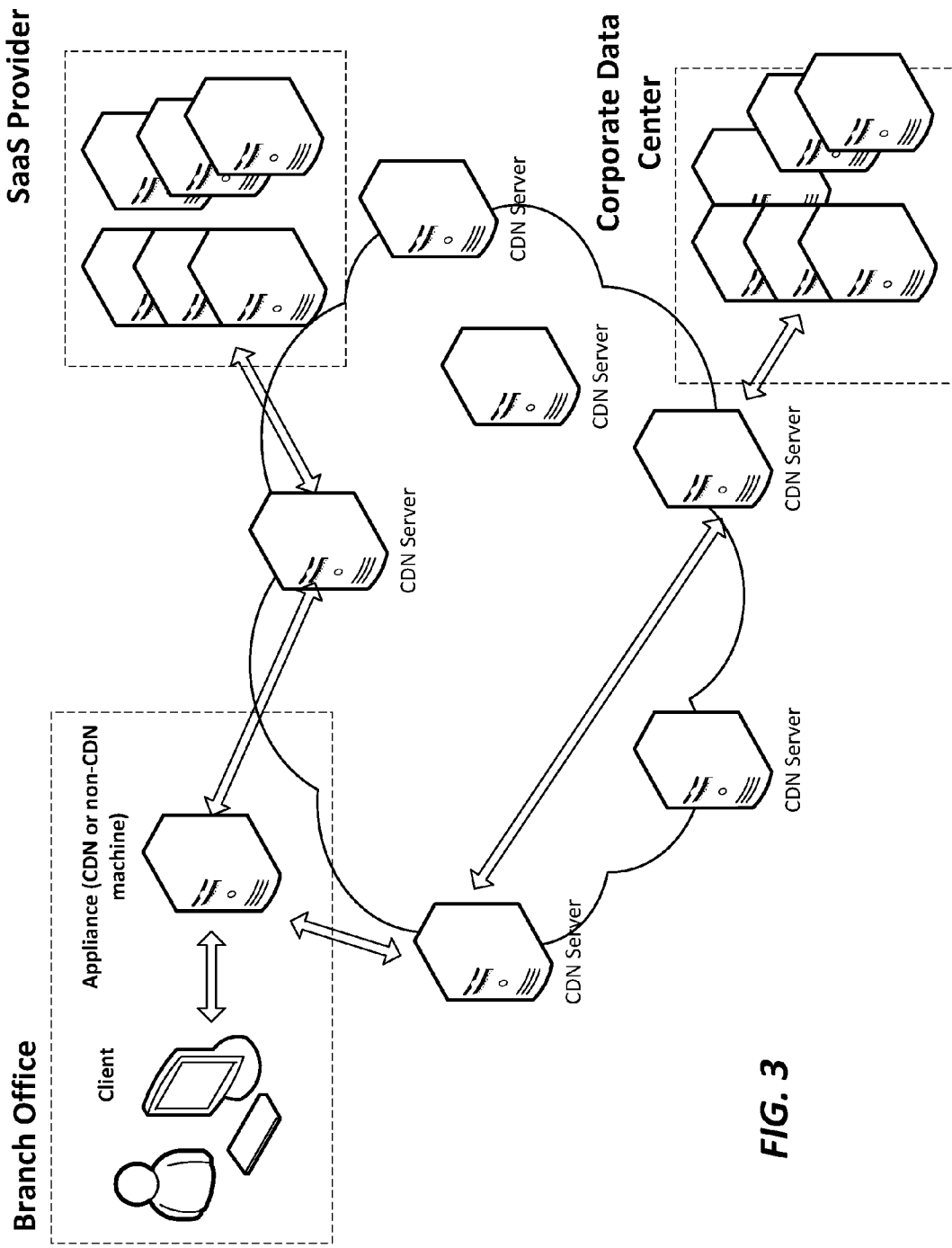
FIG. 3 is a schematic diagram illustrating one embodiment of a general architecture for a WAN optimized, "behind-the-firewall" service offering.

The following description sets forth embodiments of the invention to provide an overall understanding of the principles of the structure, function, manufacture, and use of the methods and apparatus disclosed herein. The systems, methods and apparatus described herein and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, patent application publications, other publications, and references cited herein are expressly incorporated herein by reference in their entirety, and for all purposes. Throughout this disclosure, the term "e.g." is used as an abbreviation for the non-limiting phrase "for example."

Basic familiarity with well-known web page and networking technologies and terms, such as HTML, URL, XML, AJAX, CSS, HTTP, and TCP/IP, is assumed. In this disclosure, the terms page 'object' and page 'resource' are used interchangeably with no intended difference in meaning. The term base page is used herein to refer to page defined or described by an associated markup language document (e.g., HTML, XML) that references one or more embedded resources (e.g., images, CSS, Javascript (JS), or other types), as known in the art. The term domain name herein is meant to refer to domain names at any level of specificity, including fully qualified domain names, partially qualified domain names, subdomains, without limitation. The term "web" server is meant to refer to a server that communicates (e.g., with clients) using HTTP/HTTPS. The term client or client application is meant to refer to a browser, app, or web page rendering application that executes, for example, on a laptop, smartphone, or other client device.

Introduction

The HTTP 2 specification includes the concept of server side push, in which a server can push to the client certain resources that the server believes the client will need in the future. An example of this is a client requesting a certain base HTML document for a web page and the server responding with the requested HTML document, as well as at least some of the resources that will be needed for the client (e.g., a browser) to render the page.

An example of a request/response flow that utilizes server push in accordance with HTTP 2 specification might be: (1) Client requests an HTML document for a page from a server; (2) Server responds with a series of PUSH_PROMISES of resources that will be pushed. (3) Server responds with the headers and body of the requested HTML document and then starts pushing the resources needed to fully load the page. (While it is preferable to send the HTML as soon as possible, in some cases, the server can first push the resources and then respond with the headers and body of the requested HTML document. That is, the HTML and page resources can be sent in either order under the HTTP 2 specification.) The resources can be selected based on a prediction algorithm or otherwise configured for the given page or domain, for example. (4) If the client has any of the resources the server will push, e.g., in local cache such as HTML local storage, browser cache, or otherwise, the client can send RST_STREAM frames for these resources as soon as the client receives the PUSH_PROMISE. This will stop the server from sending or continuing to send any resources that the client already has in cache. (5) Client sends separate requests for any other resource needed to render the page.

Preferably, though without limitation, for any resource to be considered 'pushable' to the client it also has to be cacheable. The motivation of doing server side push is to speed the loading of web pages by eliminating the need to request certain resources referenced in the HTML document. By doing so, the round trip times that are associated with those HTTP requests and responses for those referenced resources is eliminated.

Pushing a resource can provide a performance benefit, but pushing resources the client already has in cache can decrease overall performance. For example, a problem can arise when a server is pushing a resource that the client already has in its cache. In such a scenario, as mentioned above, the client should send an RST_STREAM frame to prevent the server from sending this resource, thereby freeing the connection for other needed resources. Sending such cached resources is considered a performance penalty because pushing the resources that the client has in the cache can delay delivering other resources that the client actually needs. Pushing such cached resources should be avoided. Even the sending of a RST_STREAM frame represents processing and bytes on wire that are unnecessary and should be avoided. Also, depending on the round trip time of the connection between the client and the server, the server may end up receiving the RST_STREAM after the server has completed sending the unwanted resource.

Proposed Solution

In a preferred embodiment, there is a web server (which may be an origin server or an intermediary proxy server, as described above) and the web server stores a versioned list of 'Pushable' Resources (PR) for a given domain. Preferably, the pushable resources are those resources for a given website that have been selected for push to a client and that are permitted to be pushed to a client (e.g., per policy set by HTTP 2.0 specifications and/or content provider policies).

Preferably, a separate list-making process (distinct, e.g., from the proxy process) is responsible for creating and maintaining the PR list, adding resources to it and releasing new versions. This list-making process may be executed, for example, in a support system of servers dedicated to this task, certain back-end servers in a CDN, and/or may be resident on the web server itself. After creation, if the list-making process is executing in a separate machine from the web server, the PR list versions are then transmitted to the web server. Newer versions of the PR list typically would be released by the list-making process whenever the PR across a website changes considerably.

By way of example, in one embodiment, such a list-making process can rely on beacons sent by client(s) that indicate the resources that have been loaded on particular web pages, using the Resource Timing API. As known in the art, the Resource Timing API enables Javascript executed on the client to extract such data from the browser. More description of Resource Timing data and a suitable data collection process from clients in general and in a CDN specifically is available in US Patent Publication No. 2013-0166634 A1 (titled "Assessment Of Content Delivery Services Using Performance Measurements From Within An End User Client Application"), the contents of which are hereby incorporated by reference in their entirety.

Further, a description of how such Resource Timing data can be used for selecting resources and developing PR lists is provided in U.S. application Ser. Nos. 15/011,412 and 15/011,409, both filed Jan. 29, 2016, (now published as US Publication Nos. 2016-0226998 A1 and 2016-0226969 A1, respectively) the contents of which are hereby incorporated by reference. For example, as described in U.S. application Ser. Nos. 15/011,409 and 15/011,412, Resource Timing data can be used to provide a feed of information that informs the server what to push to the client. This can be done by pushing content to the client to try to speed up the page that is currently loading, as well as pushing content to the client to try to speed up some multi-page transaction that the client is executing. More information about the approaches described in U.S. application Ser. Nos. 15/011,409 and 15/011,412 is provided at the end of this disclosure in Addendums A and B, respectively.

In another embodiment, a predictive algorithm can be used to build a PR list of resources to push, based on observations of prior request sequences, for example as described in US Patent Publication No. 2014-0379840 A1 (titled "Predictive Prefetching of Web Content"), the contents of which are hereby incorporated by reference. For example, based on previous request patterns, and given a request for a particular HTML document, certain objects may be likely to be requested, e.g., because they often have been requested in the past following the request for the particular HTML document. These patterns may be analyzed based on keeping track of subsequent requests to the web server from the client, and/or based on server logs. Further, a content provider can configure a list manually, based on page sequences from likely or observed transactions (e.g., landing page, product page, checkout page) and provide this list to the web server. The list can provide pushable resources for the domain. The list can be represented in metadata configuration file stored and processed by the web server, where background regarding metadata is described in U.S. Pat. No. 7,240,100, the contents of which are incorporated by reference. A variety of prediction algorithms are known the art and can be used, including the approaches described in U.S. Pat. No. 8,447,837, US Patent Publication No. 2014/0379840, US Patent Publication No. 2015/0089352, and US Patent Publication No. 2015/0120821, the contents of all of which are hereby incorporated by reference.

The invention is agnostic to the particular approach for developing the PR list, and for selecting and ranking the particular resources on the list. In other words, any of a wide variety of different approaches, such as any of the examples given above, may be used. The particular approach that is used may depend on the particular website, accuracy desired, product requirements, design choices, and implementation-specific parameters and constraints.

In one embodiment, the final PR list can represent a subset of all possible domain resources which have been selected (from the larger list generated by one of the methods described above) based on their frequency with which they are requested by clients. For example, the top N most requested resources could be selected, or all resources with high normalized frequency across client requests, or all resources requested more than K number of times (e.g., 100). Such values will typically vary from website to website, so preferably they are configurable (e.g., by the CDN service provider or the content provider). For example, one website might use top N of N=10 while another uses N=15. One website might require a high frequency of F=75% of client requests while another website might require a frequency of F=80%.

Additionally, note that the HTTP 2.0 specification provides conditions under which an object is a candidate for server-push. The list-making process preferably excludes from the PR list resources that do not meet the conditions for being a candidate for server push under the specification.

Preferably, the list-making process creates, and the web server also maintains, a distinct list of PR resources for each domain, page, class of pages, and/or per client type (e.g., laptop, mobile device, including preferably sub-classes of each). So for example, there could be a PR list for 'product-page-1.html' for laptops, and a PR list for 'product-page-1.html' for a mobile device. The page PR list is used to inform the server what resources to push when a particular client type visits a page. Preferably, resources on the page PR list also appear on the domain PR list and reference the index of this resource on the domain PR list. So, in the Example below, z.css has an index of 0 on the PR list for page b, page c, and on the domain PR list. Preferably the index remains consistent across all PR lists applicable to a given domain.

Preferably, when the web server pushes resources to a client for the first time (e.g., for the first visited page in a particular domain), the web server will set a cookie on the client. Setting a cookie is a known technique within HTTP by which a web server can have the client store data and proffer this data on subsequent visits within the scope of the cookie (which may be set to be valid for a given domain, subdomain, path on the domain, etc.). The cookie data preferably contains the current PR list version and certain data to indicate the push/client-cache status. Preferably this data is a plurality of bits. Preferably, each single bit corresponds to one of the pushable resources on the PR list. The web server will set to '1' the cookie bits that correspond to the index of the pushed resources in the PR list. The index defines the bit position in the cookie. When that client visits another page on the domain, the client will send the cookie to the web server with its HTTP request for the HTML document, in accordance with the HTTP protocol. The server can know by decoding the cookie what resources have been pushed before to that client and not push them again—thus avoiding the performance penalty of pushing resources that the client already has in cache.

The resources across the domain may change considerably at certain times, e.g., due to a content update. In this situation, preferably a new version of the PR list across the domain is released by the list-making process. The web server preferably migrates the old PR cookie for any client from the old version to the new version. In the 'Example' presented below, this is done by setting to '1' the bits that correspond to any resource that have been pushed before to the client and still exists in the new version of the PR cookie. This means that when the web server receives a client HTTP request with the old version of the cookie, it identifies resources on the old version that have been pushed, and sets a cookie for the new version with the appropriate bits already set to '1' if an old version pushable resource still exists in the new list. If an old version pushable resource does exist, it may be in a different position in the list, meaning that a different bit in the cookie needs to be set to '1'.

Example

Assume a domain a.com with two pages a.com/b and a.com/c. The pages PR lists for a mobile client on a.com/b and a.com/c can be as follows:

a.com/b
  0:z.css
  1:x.css
  2:yjs
  3:l.png
a.com/c
  0:z.css
  4:m.css
  5:yj s
  6:r.png Version 1 of the PR list for the domain a.com can be as follows:

a.com
  0:z.css
  1:x.css
  2:yjs
  3:l.png
  4:m.css
  5:yj s
  6:r.png
  7:t.js In this example, when a mobile clients visit a.com/c for the first time, the web server might push all the resources on the a.com/c list for mobile clients and set the cookie as follows:

pr:1-10001110

The term 'pr' merely refers to "pushable resources". Preferably, the format of the cookie is:

{cookie name}: {PR list version}-{base64 bit encoded value of the list}

So, on the wire, the above cookie of 'pr:1-10001110' would be encoded and set as:

pr:1-jg

When the same client requests a.com/b, it will send the cookie as part of the HTTP request. The web server can decode the cookie and determine that it has previously pushed z.ccs to this client, so it will not push it again. Once the web server determines that is has previously pushed z.css, it will only push x.css, y.js and l.png and set the cookie again with the value:

pr:1-11111110

After base64 encoding the cookie becomes:

pr:1-_g

As those skilled in the art will understand, the above solution works with distributed systems. The resource z.css may have been pushed and the cookie set by a first web server (e.g., another proxy server in a CDN) that provides content for the domain a.com, and a second web server may receive the cookie upon the subsequent request, and by decoding the cookie know that the first web server pushed z.css, so it does not need to be pushed again.

The above solution can be extended to cover a very large number of web pages and resources on the same domain. As the web server is configured to push resources for more pages on the domain, the PR list for the domain can keep growing. To set a cookie that maintains a list of 1024 resource, the length of the cookie would be 171 bytes. Thus, the above solution is very space efficient.

The Cookie Lifetime

Preferably, though without limitation, the cookie is not persistent but rather has a lifetime (also referred to as the time to live or TTL) that is proportional to the cacheability of the resources being pushed. The cookie lifetime can be set in accordance with a known standard, such as RFC 6265, which defines an 'expires' field for cookies. If the website is serving resources with different cache lifetimes (e.g., time to live or TTL values), different cookies with different resources lists, where each list holds resources with similar cache lifetime, can be maintained.

Preferably, the cookie's TTL is longer than the TTL of the resources being pushed. As mentioned, if a website is serving resources with different TTLs, then separate cookies can be constructed and used, each cookie having its own TTL. To accomplish this, each PR list stores resources with certain maximum TTL. The web server will then set a distinct cookie on the client for each PR list the web server maintains.

Example

Assume a set of pages with lists of pushable resources in the form shown below:
a.com/b
x.css: 24 hours TTL
y.css: 24 hours TTL
z.js: 1 hour TTL
l.png: 40 mins TTL
a.com/c
x.css: 24 hours TTL
m.css: 24 hours TTL
n.js: 1 hour TTL
k.png: 40 mins TTL
The web server can maintain two PR lists in the form:
pr_24 h
   0: x.css
   1: y.css
   2: m.css
pr_1 h
   0: z.js
   1: l.png
   2: n.js
   3: k.png When a client requests any of the above two pages, in response the web server preferably sets both cookies 'pr_24 h' and 'pr_1 h' with a cookie TTL of 24 hours and 1 hour, respectively, using for example the 'expires' field defined in RFC 6265. The values of these two cookies would be encoded as already described. In this manner, on a subsequent visit, the client can determine not to send any cookies that have expired.

The two lists above can be created by the list-making process that creates the PR lists. This can be accomplished by creating the page lists, then examining the TTLs of resources and sorting the page PR list, (or domain PR list, as the case may be) into multiple page PR lists based on the TTL, to arrive at the TTL-specific PR lists shown above. In other words, the various resources are assigned to one of the TTL-specific PR lists.

There are a variety of ways to determine and associate the TTL of the individual resources with their entries on the PR list. For example:

If the PR list creation occurs at the web server, the TTL of the resources can be configured at the web server (e.g., by an administrator or web publishing system, for example.

In the context of a CDN, a list-making support process can be used to create the PR list, and can take input from the content provider, e.g., via direct content provider input (via a portal site), CDN service provider configuration, or by requesting objects from a content provider origin and examining the TTLs in the cache-control-header received from an origin server. The list-making process might also consult a metadata configuration file, as previously described, in order to determine cache control information, as such files typically already contain cache control information and other configuration settings for the CDN as specified by the content provider.

In another embodiment, the list-making process of a CDN can create the "master" PR list for a given domain, or page, or the like. The master PR list is then sent to the CDN proxy servers, which can locally associate the proper TTLs with the resources via the metadata configuration file or via request to origin and cache header examination. The proxy server can then arrange the master PR list into multiple PR lists in accordance with appropriate TTL categories, as illustrated above.

In an alternate embodiment, there can be multiple PR lists (each associated with a different TTL) for each particular page. Thus, in the above example, the resources for a.com/b could be split into two cookies, 1 hr and 24 hr, that are for page b. In another example, the time periods for the cookie categories might be, for example, 1 min, 5 min, 10 min, 30 min, 1 hour, 12 hour, 1 week, persistent (never-expires), etc.

It is preferred to have the lifetime of the cookie longer than any resource appearing on the list corresponding to this cookie. This is because it is better to have a missed improvement opportunity, by not pushing a resource that the client will request, than to introduce a performance degradation by pushing a resource that the client already has in cache.

FIG. 4 is a table illustrating how different PR lists can be created and stored for different client types and with different TTLs. The individual pushable resources are shown for each URL (page) by TTL and for each type of device. The PR List Name shows how the resources would be arranged in the corresponding cookies (the list name itself can be the cookie name, as previously mentioned). As those skilled in the art will understand, the example above and shown in FIG. 4 can be extended to many more pages across a site, or indeed a single list of PR resources for a given domain can be created, and then assigned to the individual TTL-based cookies.

Computer Based Implementation

The subject matter described herein may be implemented with computer systems, as modified by the teachings hereof, with the processes and functional characteristics described herein realized in special-purpose hardware, general-purpose hardware configured by software stored therein for special purposes, or a combination thereof.

Software may include one or several discrete programs. A given function may comprise part of any given module, process, execution thread, or other such programming construct. Generalizing, each function described above may be implemented as computer code, namely, as a set of computer instructions, executable in one or more microprocessors to provide a special purpose machine. The code may be executed using conventional apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 5:
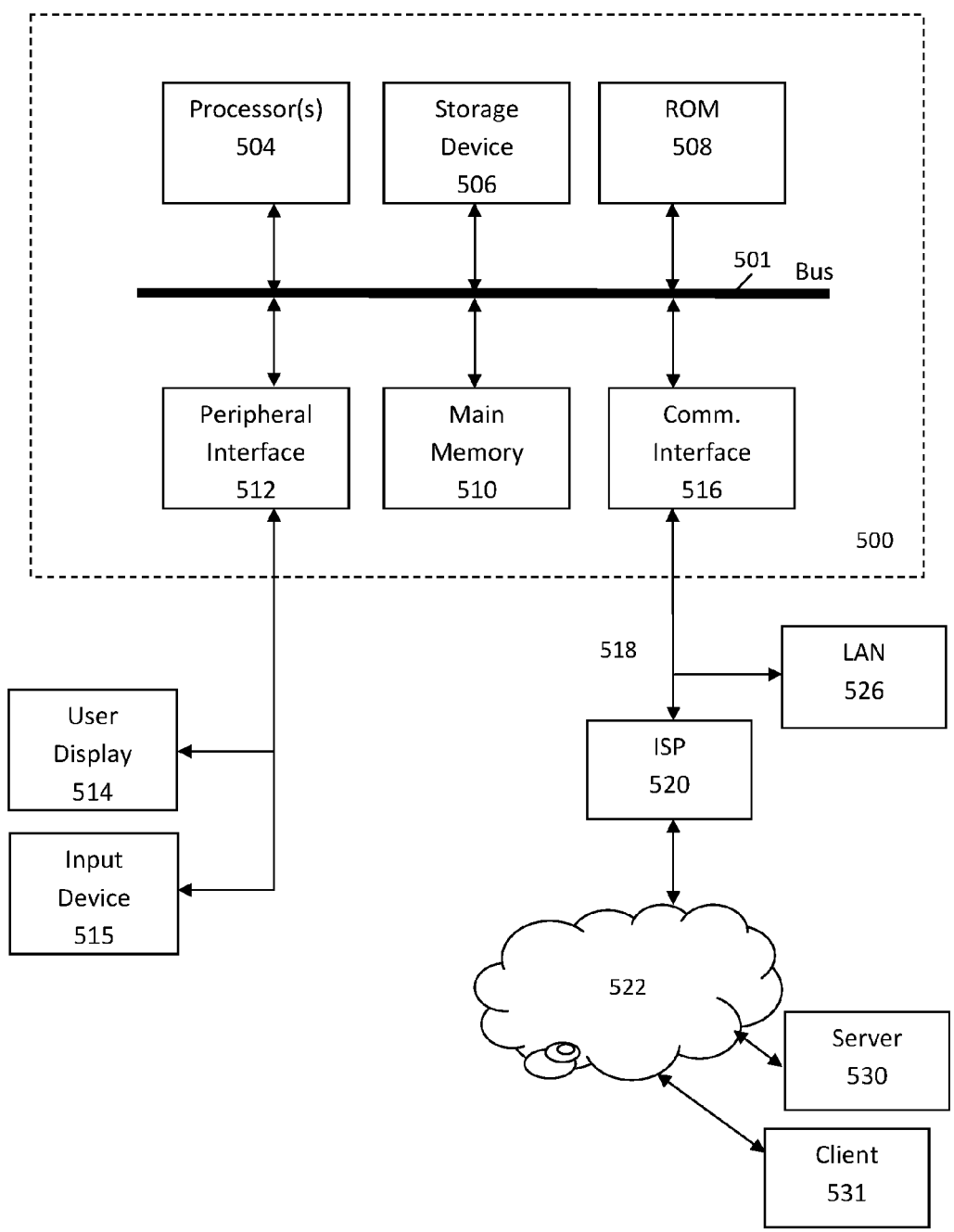

FIG. 5 is a block diagram that illustrates hardware in a computer system 500 on which embodiments of the invention may be implemented. The computer system 500 may be embodied in a client device, server, personal computer, workstation, tablet computer, wireless device, mobile device, network device, router, hub, gateway, or other device.

Computer system 500 includes a microprocessor 504 coupled to bus 501. In some systems, multiple microprocessor and/or microprocessor cores may be employed. Computer system 500 further includes a main memory 510, such as a random access memory (RAM) or other storage device, coupled to the bus 501 for storing information and instructions to be executed by microprocessor 504. A read only memory (ROM) 508 is coupled to the bus 501 for storing information and instructions for microprocessor 504. As another form of memory, a non-volatile storage device 506, such as a magnetic disk, solid state memory (e.g., flash memory), or optical disk, is provided and coupled to bus 501 for storing information and instructions. Other application-specific integrated circuits (ASICs), field programmable gate arrays (FPGAs) or circuitry may be included in the computer system 500 to perform functions described herein.

Although the computer system 500 is often managed remotely via a communication interface 516, for local administration purposes the system 500 may have a peripheral interface 512 communicatively couples computer system 500 to a user display 514 that displays the output of software executing on the computer system, and an input device 515 (e.g., a keyboard, mouse, trackpad, touchscreen) that communicates user input and instructions to the computer system 500. The peripheral interface 512 may include interface circuitry and logic for local buses such as Universal Serial Bus (USB) or other communication links.

Computer system 500 is coupled to a communication interface 516 that provides a link between the system bus 501 and an external communication link. The communication interface 516 provides a network link 518. The communication interface 516 may represent an Ethernet or other network interface card (NIC), a wireless interface, modem, an optical interface, or other kind of input/output interface.

Network link 518 provides data communication through one or more networks to other devices. Such devices include other computer systems that are part of a local area network (LAN) 526. Furthermore, the network link 518 provides a link, via an internet service provider (ISP) 520, to the Internet 522. In turn, the Internet 522 may provide a link to other computing systems such as a remote server 530 and/or a remote client 531. Network link 518 and such networks may transmit data using packet-switched, circuit-switched, or other data-transmission approaches.

In operation, the computer system 500 may implement the functionality described herein as a result of the microprocessor executing program code. Such code may be read from or stored on memory 510, ROM 508, or non-volatile storage device 506, which may be implemented in the form of disks, tapes, magnetic media, CD-ROMs, optical media, RAM, PROM, EPROM, and EEPROM. Any other non-transitory computer-readable medium may be employed. Executing code may also be read from network link 518 (e.g., following storage in an interface buffer, local memory, or other circuitry).

A client device may be a conventional desktop, laptop or other Internet-accessible machine running a web browser or other rendering engine, but as mentioned above a client may also be a mobile device. Any wireless client device may be utilized, e.g., a cellphone, pager, a personal digital assistant (PDA, e.g., with GPRS NIC), a mobile computer with a smartphone client, tablet or the like. Other mobile devices in which the technique may be practiced include any access protocol-enabled device (e.g., iOS™-based device, an Android™-based device, other mobile-OS based device, or the like) that is capable of sending and receiving data in a wireless manner using a wireless protocol. Typical wireless protocols include: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP. The WAP (wireless access protocol) also provides a set of network communication layers (e.g., WDP, WTLS, WTP) and corresponding functionality used with GSM and CDMA wireless networks, among others.

In a representative embodiment, a mobile device is a cellular telephone that operates over GPRS (General Packet Radio Service), which is a data technology for GSM networks. Generalizing, a mobile device as used herein is a 3G—(or next generation) compliant device that includes a subscriber identity module (SIM), which is a smart card that carries subscriber-specific information, mobile equipment (e.g., radio and associated signal processing devices), a man-machine interface (MMI), and one or more interfaces to external devices (e.g., computers, PDAs, and the like). The techniques disclosed herein are not limited for use with a mobile device that uses a particular access protocol. The mobile device typically also has support for wireless local area network (WLAN) technologies, such as Wi-Fi. WLAN is based on IEEE 802.11 standards. The teachings disclosed herein are not limited to any particular mode or application layer for mobile device communications.

It should be understood that the foregoing has presented certain embodiments of the invention that should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that trademarks appearing herein are the property of their respective owners and used for identification and descriptive purposes only, given the nature of the subject matter at issue, and not to imply endorsement or affiliation in any way.

Addendum A for U.S. patent application Ser. No. 15/011,412

As described in U.S. patent application Ser. No. 15/011,412, a system can collect Resource Timing data on a percentage of all page views, and extract several independent metrics from the data, such as: freq=percentage of samples showing that a particular resource was loaded during the load of a specific base page; lat=median amount of time it took to load a particular resource. (This metric is more formally defined as applying to an object/base-page pair rather than to an object in isolation; seq=index in the fetch order (how many resources were fetched prior to the one in question); the type of object (image, CSS, JS, etc.) can in most cases be inferred from the file name (e.g., the extension), and where this is not possible an external data-collection utility can gather up the object-type data (the value of the Content-Type header) by doing HEAD or GET requests against specific embedded objects that were identified by RT data. A process can compute the resources with the highest freq*lat value and publish the results to a table. A subset of the resources can be selected, e.g., by omitting those with values less than some threshold. For example, in one embodiment, the freq threshold might be 40% and the lat threshold might be 20 ms. In other embodiments, the freq might be in a range of 40-70%, and the lat might be in a range of 10-25 ms. In yet another embodiment, the threshold can be 40*30=1200. The threshold can be set on the product (e.g. 40*30, or 40*20, per the prior embodiment) rather than individually on the components (e.g. 40% and 30 ms) in order to focus on overall impact to page load time. For example, a resource with freq=20% and lat=100 ms would be a candidate in this scheme, whereas it would not be if the threshold were applied individually to freq and lat. Approximate ties can be broken by prioritizing resources with lower seq values and/or by preferring certain object types, such as those that represent CSS or Javascript. (More advanced thresholding can also be applied, for example, applying thresholds on freq and lat in addition to their product. As an example, any resource requiring 300 ms or more to load might be automatically considered for push, even if often cached, because the penalty for not having it is so high.) In general one can define some function $f$(freq, lat, seq, object-is-css-or-js), and rank objects to pre-push according to the value of the function. In one embodiment, the function can be: Score=freq*lat-K1*seq+K2*(object-is-css-or-js). Reasonable values for K1 and K2 might be 1 and 10, for example. In other embodiments values might range between K1=1 to 100 and K2=1 to 100, which would allow swinging the weights of the latter two terms up into a range where they actively compete with the first term in most cases. (A weighting—that is, a coefficient—could also be applied to the freq*lat product, in some embodiments.) In this case, if freq=100% and lat=100 ms, then the leftmost term is 10,000 and dominates the rightmost terms no matter what their value. But if freq=10% and lat=10 ms, then the leftmost term is only 100, and the other two terms have significant impact on the results. A proposed implementation might fix these values across all sites (e.g., as defined by hostname), or might allow them to vary from site to site, trying to tune them for optimal performance. Given the above function, an offline utility (e.g., a computer machine distinct from the CDN proxy servers, such as the back-end system 308 and/or visualization system 310 shown in US Patent Publication No. 2013/0166634 A1) can compute the score for each embedded resource that is on a hostname that is configured to be allowed to be pushed on the base page connection. Given the list of candidate objects and the computed scores, the offline utility can identify the resources with the highest scores, apply some thresholding as described above, and publish a table (e.g., the PR list) to a proxy server, such as CDN servers described above. The proxy server can then push one or more of these resources, in scoring order, upon receiving a client request for the base page associated with the table.

End of Addendum A

Addendum B for U.S. patent application Ser. No. 15/011,409

As described in U.S. patent application Ser. No. 15/011,409, there is the possibility of choosing objects to push to the client based on the expected cumulative benefit to the end-to-end transaction, as opposed to the expected benefit for the single page-fetch that is in progress. It also raises the possibility of pushing objects to the client during idle time that occurs while the end-user is reading and/or interacting with the web page, which can substantially expand the number of objects that might be pushed.

In order to accomplish this, the server needs to (1) recognize that a particular end-user is engaged in a particular transaction, (2) identify the expected steps in that transaction prior to the time the end-user has fully executed it, and (3) identify the content that is most likely to be beneficial for performance on each step of the transaction, and (4) identify the available time windows in which to push. Accomplishing this while maintaining a low rate of wasted pre-push is a significant challenge.

Identifying Time Windows in which to Push

The discussion starts with task (4). A server can immediately open a push time window when it receives a request for a base page HTML document that it has to forward to the origin server. It can close that push window when the base page arrives from the origin. It can re-open the push window when the connection from the end-user has gone idle and remained idle for N milliseconds. N can be something fixed like 200 ms or in a range of 100-500 ms (to make it probable that the delay is not just rendering or Javascript execution time on the client), or it could be derived from the RT data by examining the duration of any dead time that commonly occurs during the fetch of the base page in question.

Identifying Objects to Push

Moving on to task 3, assuming a server knows the expected transaction steps (where steps herein mean pages, i.e., step 1 is page 1 in the sequence, etc.), it can look up the object score tables for each base page in the transaction, and identify the objects with the largest scores across the whole series. Having identified these objects, the server can apply a "discount function" to reduce the scores associated with objects that are nearer the end of the transaction versus nearer the end-users current step in the transaction. This is because the probability of the end-user actually needing these objects diminishes with the number of page views still remaining in the transaction before encountering those objects. In one embodiment the discount function can be a linear function: for example, if an object is not needed until N more steps of the transaction have completed (N pages further in the navigation sequence), the score on that object can be reduced by k*N percent, where k might be about 10, or in a range of about 5-25.

On the first push window (loading the base page on the first step of a transaction), the server can choose to push only objects that are expected to speed up that base page. This is because the initial push window is short, and the server does not yet know that the client is going to engage in a transaction at all. The server can rationally expect that the push window that opens after the first page has been delivered but before the second page has been requested will be longer, and can therefore choose to push objects expected to help later phases of the transaction if the scores so indicated.

When a client requests the base page at step N in the transaction, the server can choose to eliminate all push candidates that were likely needed at a prior step, since the client very likely has these objects already. It can apply a different function on the score here than the one described above, preferably based only on freq. For example, suppose object X is identified as a push candidate at steps 1, 3, 4, and 6 of a transaction, and that the corresponding freq values for object X appearing on the corresponding pages are $f1$, $f3$, $f4$, and $f6$. When the end-user client makes the request for step 6 (in other words, after making requests at the prior steps and reaching step/page 6), the probability that the client already has object X is $1-(1-f1)*(1-f3)*(1-f4)$. Generalizing, the probability can be calculated as: $1-\Pi_1^N (1-\text{freq}_N)$ $1-\Pi_1^N(1-\text{freq}_N)$ where $1 \ldots N$ are the steps in which the object X was identified as a push candidate. The server can apply a threshold (e.g., about 20%) to this computation to decide whether to push the object at step 6. In other embodiments, other thresholds might be used, e.g., in a range of 10-30%, or otherwise. These are non-limiting examples.

Identifying a Transaction

Current solutions in the field gather RT data for a subset of all page views (e.g., a small percent %), by sampling individual pages at random (without regard to any transaction we might be in). However one can convert these to a transactional sampling approach. A method for achieving this is as follows: when an end-user visits a page, the server will check for the existence of a particular cookie that has domain scope (i.e. applies to the entire site example.com rather than a given page). If it does not exist or enough time has passed since that cookie was last set on this user (e.g., by looking at a timestamp in the cookie), the server will declare this page fetch to be the start of a transaction. It will then decide whether or not it wants to sample this transaction. It might pick purely at random to achieve a particular sampling rate, or it might use characteristics of the page or the end-user to decide to sample (e.g., due to via customer metadata configuration that identifies a landing page, or a customer's preference for optimizing performance for specific bodies of end-users, such as those in a particular geography). If the transaction is selected for sampling, the server sets a cookie with a current timestamp, indicating that all page fetches on the given hostname should be sampled for some period of time (typically a few minutes) from this end-user. The cookie preferably includes a transaction identifier (e.g., a constant that is reported back with the beacon data and enables the system 308/310 to correlate the data corresponding to a given transaction.)

This sampling approach allows a processing engine to extract the most common transactions from the RT data that has accumulated for a given hostname or customers. Alternatively, since many content providers already have web analytics on their sites, one could develop an interface to these web analytics and extract information about the most common transaction (of course, with authorization from the content provider customer).

In an alternative embodiment, rather than transaction sampling approach described above, the system instead employs a 'master' push table. The offline utility, based on the random individual page samples from a defined scope (which are not necessarily known to be in the same transaction) builds a "master" table of pushable resources. The defined scope may be all pages under the site domain name, or a subdomain, domain plus pathname, or other partition, but preferably the scope is broad. The offline utility can rank the resources using the scoring methodology as described above, resulting in a master table of pushable candidates that are associated with the entire domain (or other defined scope). As before, this table is communicated from the offline utility to servers. The push process then proceeds as follows: A server receives a client request for a base page, page.html, under a domain example.com. The server responds with the base page and after client requests, with embedded resources (although some of which may be pushed according to the single-page proposal). After this time, preferably after an idle time such as 200 ms, the server pushes top ranked resources for the example.com domain. While the specific transaction (i.e., web navigation sequence) is not known to the server in this situation, if the client requests another page on the example.com domain, the pushed candidates represent the embedded resources most likely to be requested, per the master table. As those skilled in the art will understand, the logic of the approach follows analogously regardless of the scope of the master table.

Identifying which Transaction an End-User is Starting

After identifying the most common transactions based on URLs visited, it becomes necessary to for the server to identify which transaction an end-user is in before deciding what to push. If the transactions identified in the above steps do not share URLs, or do not share URLs early in the transaction, then the first or second page request issued by the client might be sufficient to identify the transaction at the server. If many transactions have a common starting point (e.g., a common page), then the server has less information upon which to select objects for push. In this case, it can identify the full suite of possible transactions based on the transaction steps seen so far, and assign a probability to each based on how common that transaction is in the data as a whole. Then it can identify all pushable objects across all such transactions, and discount the object scores (i.e., for a given transaction) based on the above-computed probability of how common the transaction is in the data as a whole. From these results it can choose objects to push, applying some minimum threshold value (e.g., about 20%, or in other embodiments in a range of about 10-30%, or other value) to avoid pushing any object that is unlikely to be needed.

End of Addendum B

The invention claimed is:

1. A method performed by a web server to avoid pushing resources cached at a client, comprising:

receiving a request from a client for a markup language document, the markup language document being associated with and locatable at a Universal Resource Locator (URL);

accessing a stored list of pushable resources that is associated with the URL, the stored list comprising a list of a plurality of pushable resources;

sending the markup language document to the client, in response to the request;

pushing a particular resource other than the markup language document to the client, without an associated client request therefor, the particular resource being pushed because the particular resource is on the stored list;

setting a cookie on the client, the cookie comprising a single bit that amongst the plurality of pushable resources corresponds only to the particular resource that was pushed from the web server and that is on the stored list, the single bit being set to indicate that the particular resource has been pushed to the client.

2. The method of claim 1, further comprising:
receiving a second request from the client for a second markup language document located at a second URL;
receiving the cookie from the client in conjunction with the second request;
determining, based on the single bit in the cookie, that the particular resource was previously pushed to the client and, therefore, determining not to push the particular resource to the client.

3. The method of claim 1, wherein the single bit is encoded in the cookie.

4. The method of claim 3, wherein the encoding is a base-64 encoding.

5. The method of claim 1, wherein the index applies across a domain.

6. The method of claim 1, further comprising storing in the cookie a version number for the stored list.

7. The method of claim 1, wherein the request comprises an HTTP 2.x request.

8. A method performed by a web server to avoid pushing resources cached at a client, comprising: receiving a request from a client for a markup language document, the markup language document being associated with and locatable at a Universal Resource Locator (URL);
accessing a first stored list of pushable resources that is associated with the URL, the stored list comprising a first list of a plurality of pushable resources that are each associated with time to live (TTL) values below a particular value;
sending the markup language document to the client, in response to the request;
pushing a first resource other than the markup language document to the client, without an associated client request for the first resource, the first resource being pushed because the first resource is on the first stored list;
setting a first cookie on the client, the first cookie comprising data corresponding to the first resource that was pushed from the web server and that is on the first stored list, the data indicating that the first resource has been pushed to the client;
wherein the first cookie has a first lifetime longer than the particular value;
accessing a second stored list of pushable resources that is associated with the URL, the second stored list comprising a second list of a plurality of pushable resources that are each associated with time to live (TTL) values above the particular value;
pushing a second resource other than the markup language document to the client, without an associated client request for the second resource, the second resource being pushed because the second resource is on the second stored list;
setting a second cookie on the client, the second cookie comprising data corresponding to the second resource that was pushed from the web server and that is on the second stored list, the data indicating that the second resource has been pushed to the client;
wherein the second cookie has a second lifetime greater than any of the TTL values in the second stored list.

9. The method claim 8, wherein the first lifetime is in a range of 0 to 15 minutes, and the second lifetime is in a range of 15 minutes to 1 hour.

10. The method of claim 8, further comprising storing in the first cookie a version number for the first stored list.

11. The method of claim 8, wherein the request comprises an HTTP 2.x request.

12. A method for avoiding server push of resources cached at a client, comprising:
with a web server, receiving a request from a client for a markup language document, the markup language document being associated with and locatable at a Universal Resource Locator (URL);
the web server accessing a stored list of pushable resources that is associated with the particular domain name, the stored list comprising a list of a plurality of pushable resources;
the web server sending the markup language document to the client, in response to the request; the web server pushing a particular resource other than the markup language document to the client, without an associated client request for the particular resource, the particular resource being pushed because the particular resource is on the stored list;
the web server setting a cookie on the client, the cookie comprising data corresponding to the particular resource that was pushed from the web server and that is on the stored list, the data indicating that the particular resource has been pushed to the client;
wherein each of the plurality of pushable resources on the stored list is associated with a time to live (TTL) value and the stored list is associated with a lifetime;
wherein the cookie stores lifetime data that defines a lifetime for the cookie equivalent to the lifetime for the stored list, the lifetime being longer than the TTL values of all the pushable resources on the stored list;
further comprising, prior to the web server receiving the request, and with a process executing on the web server or on a server distinct from the web server, determining TTL values associated with each of the plurality of pushable resources on the stored list, and assigning the plurality of pushable resources to the stored list because they have TTL values less than the lifetime of the stored list.

13. The method of claim 12, further comprising:
receiving a second request from the client for a second markup language document;
receiving the cookie in conjunction with the second request;
determining whether the lifetime of the cookie has expired; when the lifetime of the cookie has expired: determining to push the particular resource to the client, without an associated client request therefor;
when the lifetime of the cookie has not expired: determining not to push the particular resource to the client, even though the particular resource is on the stored list.

14. The method claim 12, wherein the lifetime data comprises any of: timestamp and a cookie time-to-live value.

15. The method of claim 12, wherein the lifetime is proportional to the time-to-live value of the particular resource.

16. The method of claim 12, wherein the web server stores multiple lists of resources for the URL, each of the multiple stored lists associated with a different lifetime.

17. The method of claim 12, wherein the stored list is associated with the URL because it is associated with a domain name of the URL.

18. The method of claim 1, wherein the cookie comprises a plurality of bits, each one of the plurality of bits corresponding to a different pushable resource on the list, the value of that single bit indicating for each corresponding pushable resource whether such resource has been pushed to the client.

* * * * *